(12) United States Patent
Yang

(10) Patent No.: US 9,511,785 B2
(45) Date of Patent: Dec. 6, 2016

(54) TRANSPORT CART

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Guang Yang, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 7 days.

(21) Appl. No.: 14/587,549

(22) Filed: Dec. 31, 2014

(65) Prior Publication Data

US 2016/0144878 A1    May 26, 2016

(30) Foreign Application Priority Data

Nov. 26, 2014 (CN) .......................... 2014 1 0703427

(51) Int. Cl.
*B62B 3/00* (2006.01)
(52) U.S. Cl.
CPC ..................................... *B62B 3/002* (2013.01)
(58) Field of Classification Search
None
See application file for complete search history.

(56) References Cited

U.S. PATENT DOCUMENTS

| 2004/0239061 | A1* | 12/2004 | Chen | A61H 3/04 |
| | | | | 280/47.35 |
| 2005/0046127 | A1* | 3/2005 | Cheng | B60T 1/005 |
| | | | | 280/19 |
| 2012/0195525 | A1* | 8/2012 | Sabounjian | B65D 31/08 |
| | | | | 383/38 |

* cited by examiner

*Primary Examiner* — John Walters
*Assistant Examiner* — Hilary L Johns
(74) *Attorney, Agent, or Firm* — Zhigang Ma

(57) ABSTRACT

A transport cart includes a main body and a plurality of fixing mechanisms assembled to the main body. The main body includes a plurality of supports and a plurality of rollers. Each fixing mechanism includes a first fixing element, a rotating element coupled to the first fixing element, a slider, a connecting element, a pull rod connected to the rotating element, and an elastic element assembled to the main body. The rotating element includes a first spiral arm and a second spiral arm, the slider includes a second fixing element and a stay bar. The second spiral arm can be engaged with the connecting element, to slip the stay bar relative to the support. The elastic element resists against the pull rod, to maintain attachment between the rotating element and the corresponding support.

10 Claims, 5 Drawing Sheets

TRANSPORT CART

FIELD

The subject matter herein generally relates to a transport cart, and particularly to a transport cart having a braking function.

BACKGROUND

Typical conventional transport carts can include a housing, a plurality of wheels assembled to the housing, and the housing can receive a load of materials (e.g., raw materials, finished products, foodstuffs, etc.). An operator can transport a load of materials from one place to another by rolling the plurality of wheels.

BRIEF DESCRIPTION OF THE DRAWINGS

Implementations of the present technology will now be described, by way of example only, with reference to the attached figures.

DETAILED DESCRIPTION

Figure 1:
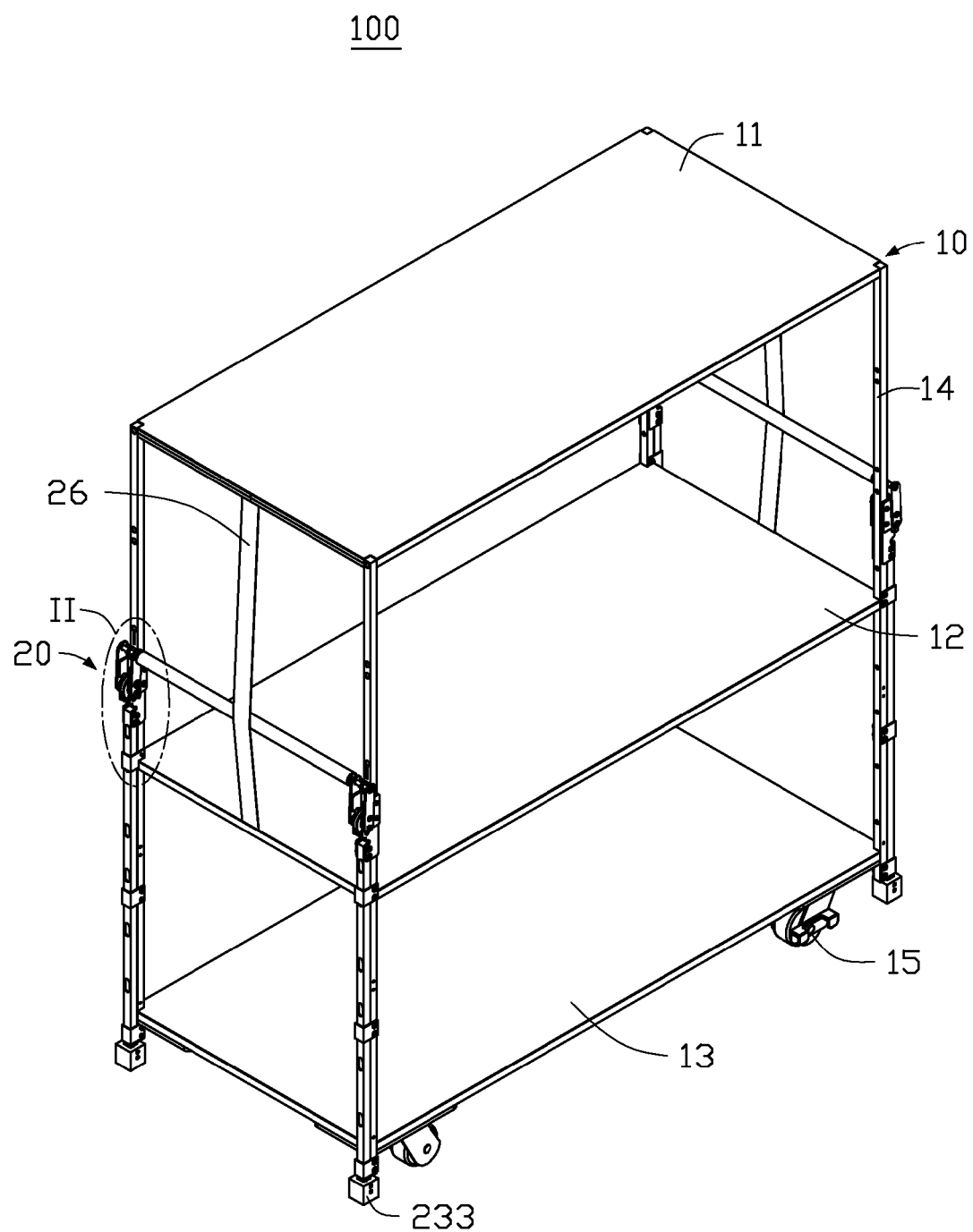
FIG. 1 is an isometric view of an embodiment of a transport cart.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising", when utilized, means "including, but not necessarily limited to"; it specifically indicates open-ended inclusion or membership in the so-described combination, group, series and the like.

The present disclosure is described in relation to a transport cart.

FIG. 1 illustrates an isometric view of an embodiment of a transport cart 100. The transport cart 100 can include a main body 10 and a plurality of fixing mechanisms 20 assembled to the main body 10. The plurality of fixing mechanisms 20 can lock the transport cart 100 by contacting the ground (not shown), also the plurality of fixing mechanisms 20 can unlock the transport cart 100 by separating from the ground.

The main body 10 can include an upper plate 11, a middle plate 12, a bottom plate 13, a plurality of supports 14, and a plurality of rollers 15. The upper plate 11, the middle plate 12, and the bottom plate 13 can both have a same shape and size. In the illustrated embodiment, the same shape can be substantially rectangular, and the middle plate 12 can be sandwiched between the upper plate 11 and the bottom plate 13. The plurality of supports 14 can be respectively corresponding to the corners of the upper plate 11, the middle plate 12, and the bottom plate 13. Each of the plurality of supports 14 can be perpendicular to the upper plate 11, the middle plate 12, and the bottom plate 13. The plurality of rollers 15 can be assembled to a surface of the bottom plate 13 away from the middle plate 12, and the transport cart 100 can move by rolling the plurality of rollers 15.

Figure 2:
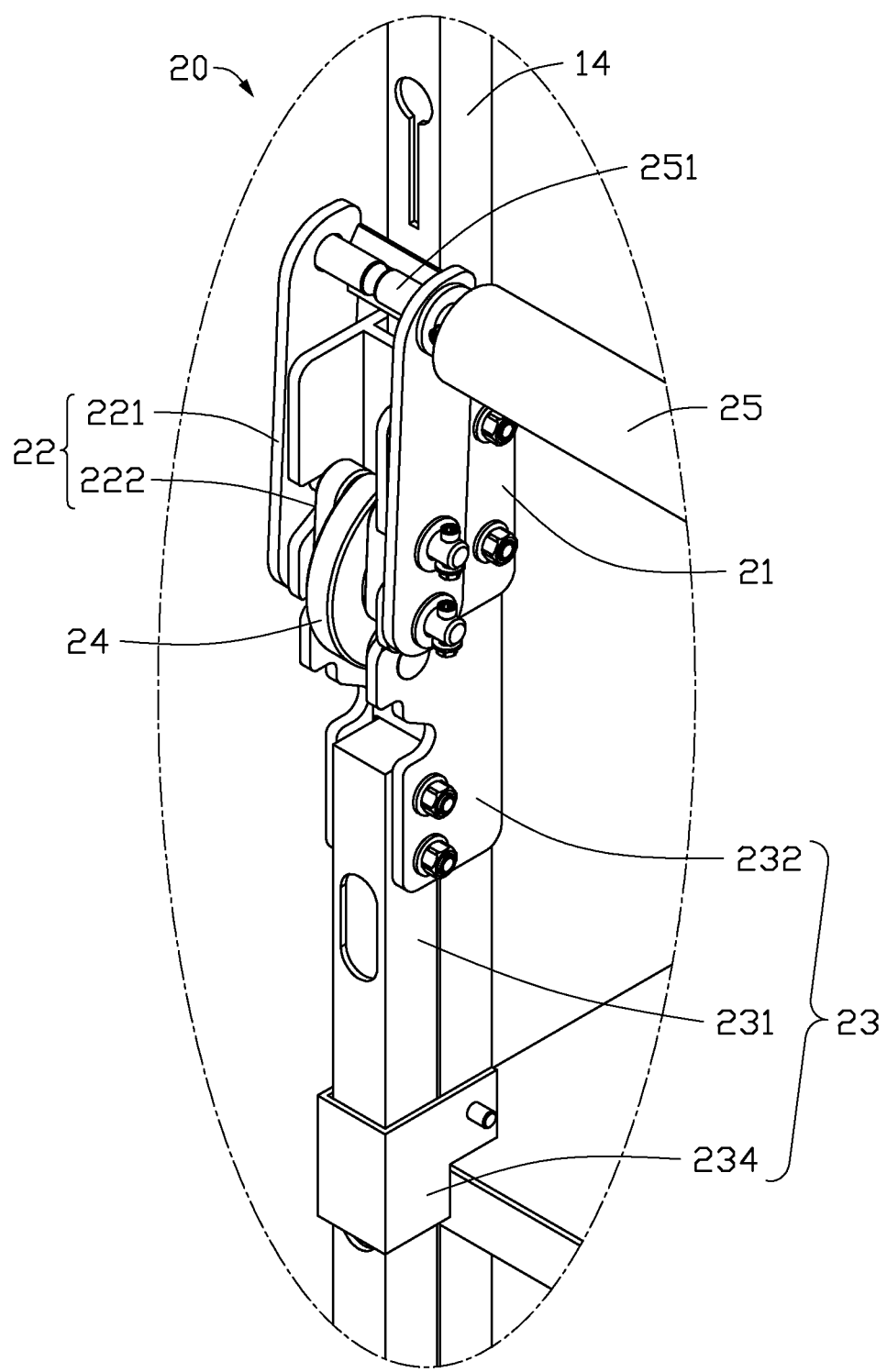
FIG. 2 is a partial, enlarged view of circled portion II of the transport cart as shown in FIG. 1.

FIG. 2 illustrates a partial, enlarged view of circled portion II of the transport cart. Each of the plurality of fixing mechanisms 20 can include a first fixing element 21, a rotating element 22, a slider 23; a connecting element 24, and a pull rod 25. The first fixing element 21 can be assembled to the corresponding support 14, the rotating element 22 can be rotationally connected to the first fixing element 21, the slider 23 can move relative to the corresponding support 14, the connecting element 24 can be rotationally connected between the slider 23 and the rotating element 22, and the pull rod 25 can be connected to the rotating element 22.

Figure 3:
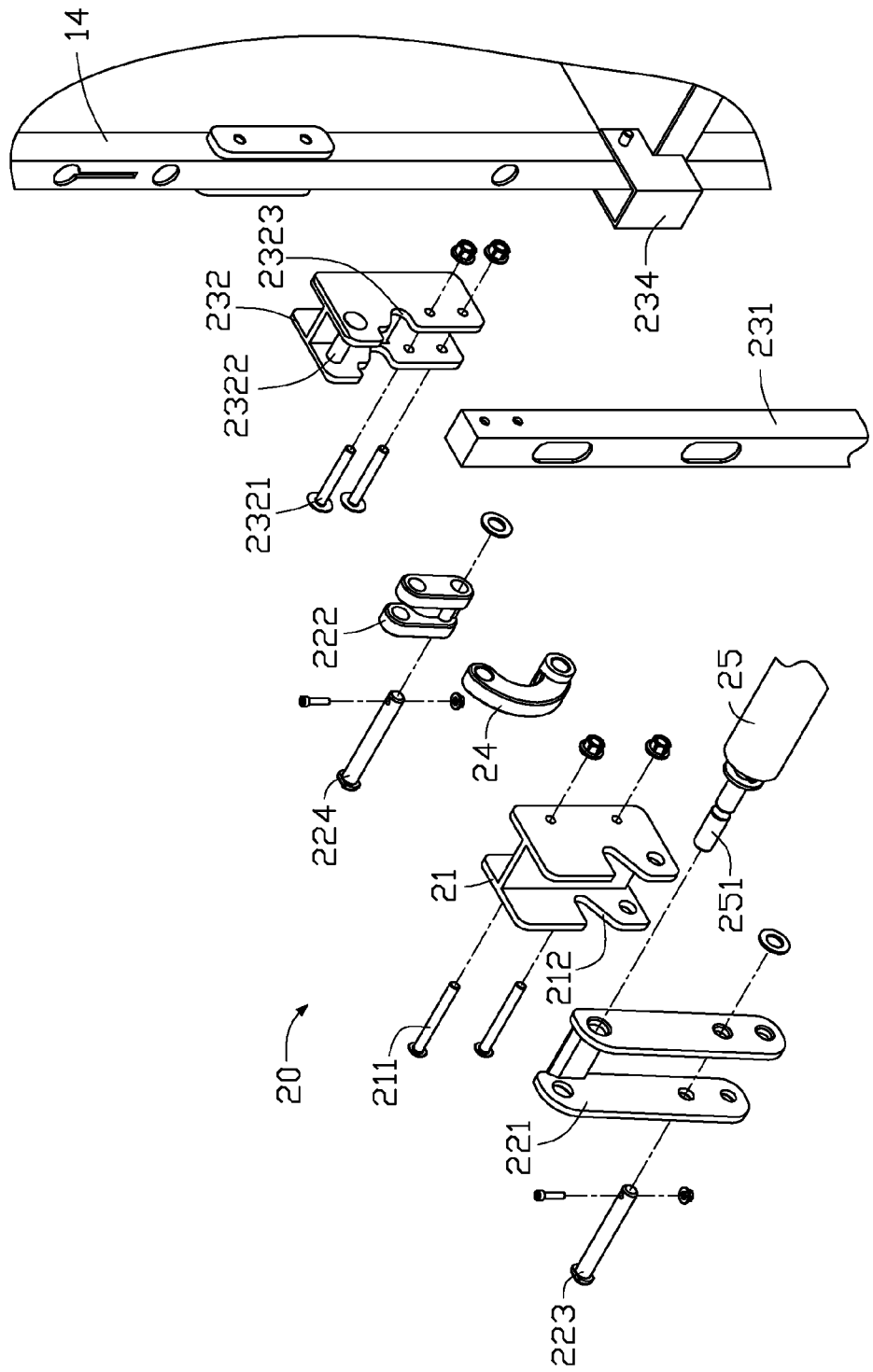
FIG. 3 is an exploded, enlarged view of circled portion II of the transport cart as shown in FIG. 1.

FIG. 3 illustrates an exploded, enlarged view of circled portion II of the transport cart. The first fixing element 21 can include a plurality of first screw assemblies 211, and the first fixing element 21 can be fastened on the corresponding support 14 by the plurality of first screw assemblies 211. A first notch 212 can be defined on the first fixing element 21 away from the corresponding support 14.

The rotating element 22 (shown in FIG. 2) can include a pair of first spiral arms 221, a second spiral arm 222 sandwiched between the pair of first spiral arms 221, a first spindle 223, and a second spindle 224. The second spiral arm 222 can be assembled to the pair of first spiral arms 221 by the first spindle 223 and the second spindle 224. The pair of first spiral arms 221 and the second spiral arm 222 can both be rotationally connected to the first fixing element 21 by the first spindle 223. A size of the cross section of the second spindle 224 can be equal to a size of the first notch 212, and the second spindle 224 can be exactly received in the first notch 212. The connecting element 24 can be substantially bow-shaped. One end of the connecting element 24 can be rotationally assembled to the second spindle 224; the other one can be rotationally connected to the slider 23. A length of the second spiral arm 222 can be less than a length of the connecting element 24, which can make the second spiral arm 222 fully received in the connecting element 24. In the illustrated embodiment, a length of the second spiral arm 222 can be substantially one third of the first spiral arms 221.

The slider 23 (shown in FIG. 2) can include a stay bar 231 and a second fixing element 232 connected to the stay bar 231, the stay bar 231 can be parallel to the corresponding support 14, and the second fixing element 232 can be coupled to the first fixing element 21. The second fixing element 232 can include a plurality of second screw assemblies 2321 and a connecting shaft 2322, and stay bar 231 can be assembled to the second fixing element 232 by the plurality of second screw assemblies 2321. The connecting element 24 can be assembled to the second fixing element 232 by the connecting shaft 2322. A second notch 2323 can be defined on the second fixing element 232 away from the support 14.

A pair of shafts 251 can be defined on two ends of the pull rod 25, and the pull rod 25 can be rotationally connected to the pair of first spiral arms 221 by the pair of shafts 251. A size of the cross section of each shaft 251 can be equal to a size of the second notch 2323.

Figure 4:
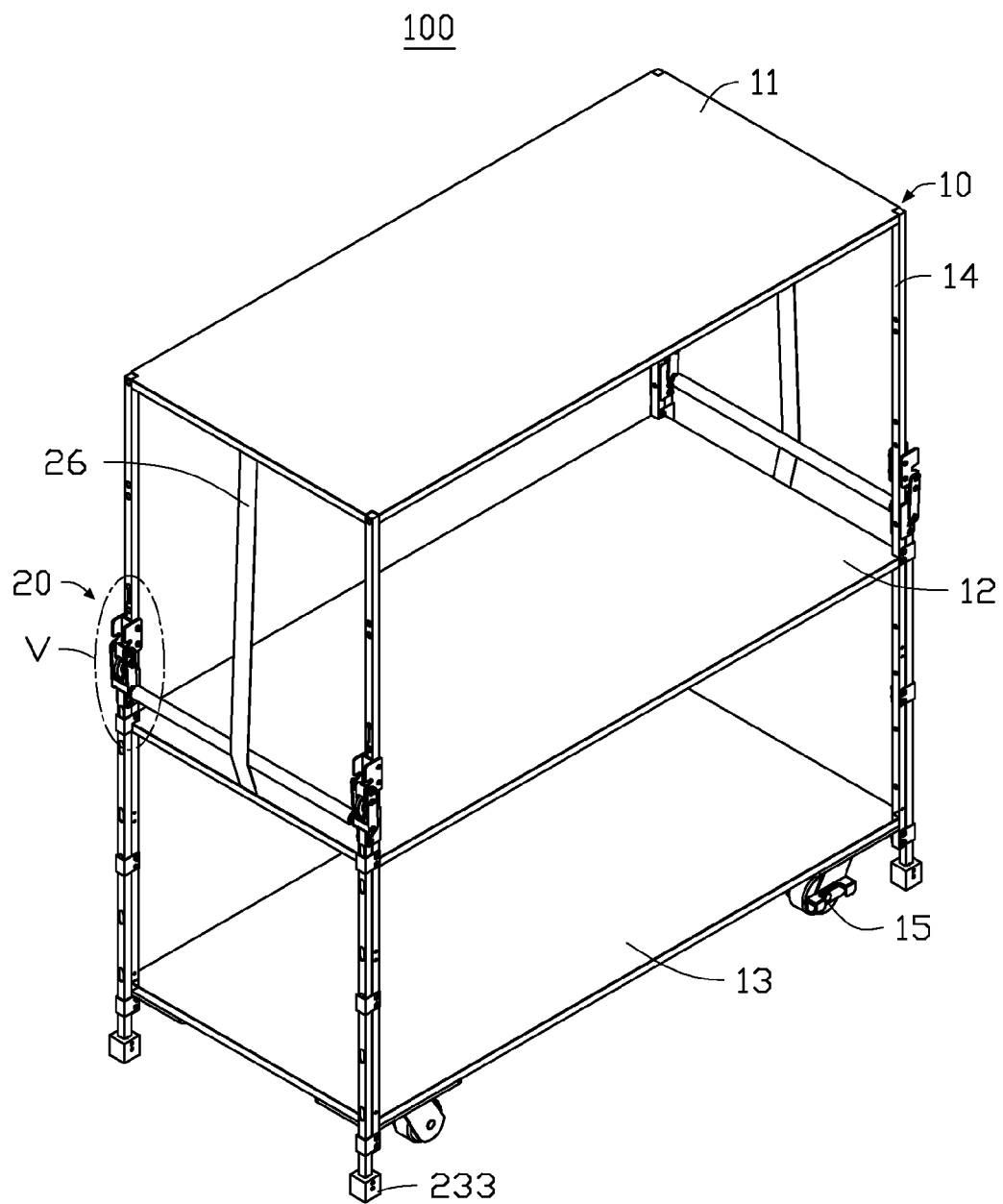
FIG. 4 is another isometric view of the transport cart, showing the stationary state of the transport cart as shown in FIG. 1.

FIG. 4 illustrates another isometric view of the transport cart 100, showing the stationary state of the transport cart 100. The slider 23 (shown in FIG. 2) can further include a rubber mat 233, and the rubber mat 233 and the second fixing element 232 can be respectively assembled to two ends of the stay bar 231 (shown in FIG. 3). In the illustrated embodiment, the rubber mat 233 can be made of leather, or plastic material. A friction coefficient between the leather, the plastic and the ground is larger than that of other materials, which can improve the fixation strength of the plurality of fixing mechanisms 20.

The transport cart 100 can also include a pair of elastic elements 26 connected between the upper plate 11 and the middle plate 12. Each elastic element 26 can resist against the corresponding pull rod 25 (shown in FIG. 3), to make the pull rod 25 always be attached to the support 14. The pair of elastic elements 26 can be respectively assembled on the opposite sides of the main body 10.

Figure 5:
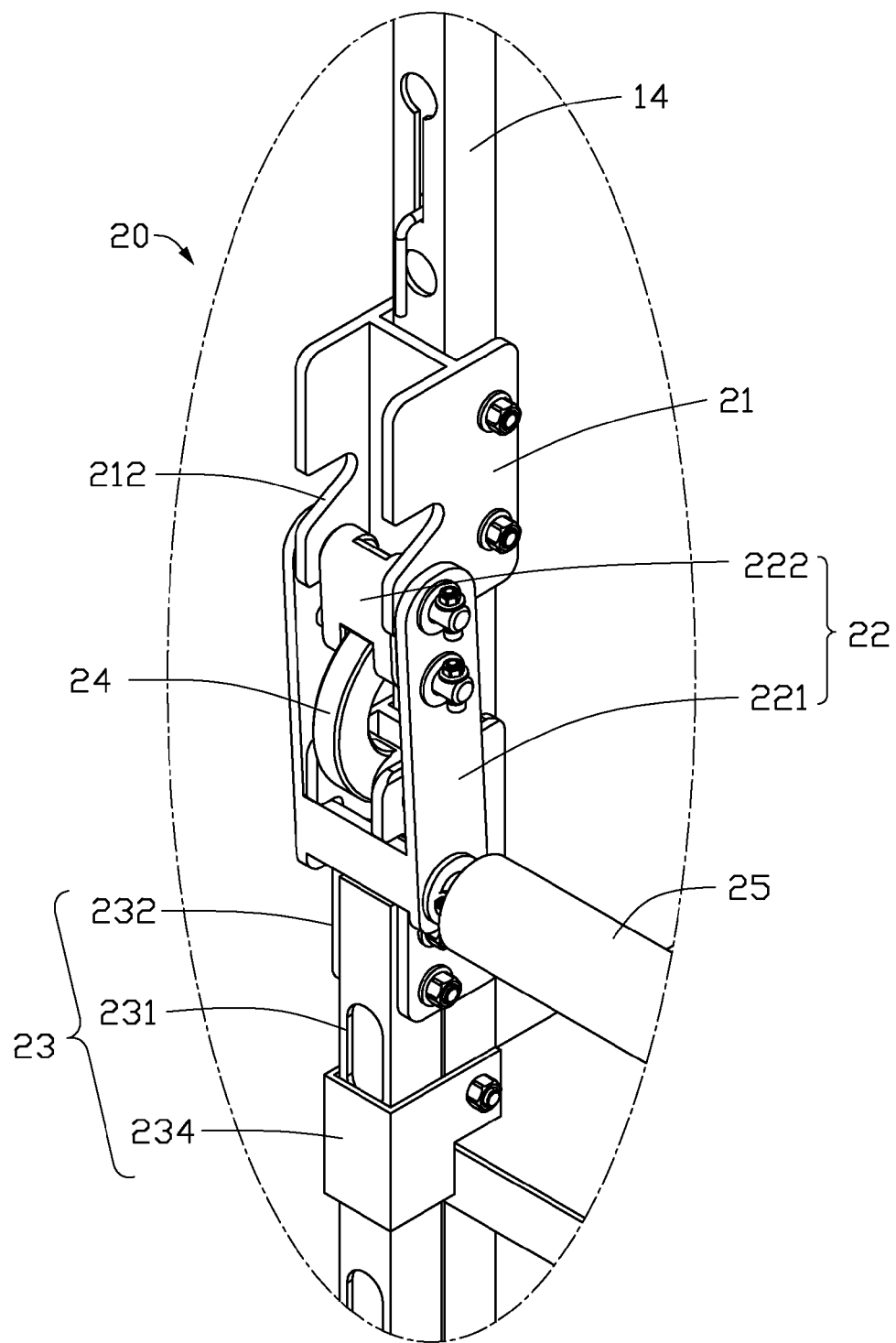
FIG. 5 is a partial, enlarged view of circled portion V of the transport cart as shown in FIG. 4.

FIG. 5 illustrates a partial, enlarged view of circled portion V of the transport cart 100. The slider 23 can further include a plurality of guiding portions 234 fastened on the support 14, and the stay bar 231 can pass through the plurality of guiding portions 234. The plurality of guiding portions 234 can be configured to limit a direction of motion of the stay bar 231.

FIGS. 1-5 illustrate an operating principle of the transport cart 100. In operation, an operator can pull down the pull rod 25 when the transport cart 100 needs to be fastened, the rotating element 22 can be rotated toward the second fixing element 232, and an action length of the second spiral arm 222 and the connecting element 24 along the support 14 can increase. When the shaft 251 of pull rod 25 is received in the second notch 2323 and the action length of the second spiral arm 222 and the connecting element 24 along the support 14 reaches the maximum, the slider 23 can move toward the ground, until the rubber mat 233 presses against the ground. Each of the pair of elastic elements 26 can elastically resist against the corresponding pull rod 25, and can be configured to protect the shaft 251 from moving out of the second notch 2323.

The operator can push up the pull rod 25 when the transport cart 100 needs to be unlocked, the rotating element 22 can be rotated toward the first fixing element 21, and an action length of the second spiral arm 222 and the connecting element 24 along the support 14 can decrease. When the first spindle 223 of the rotating element 22 is received in the first notch 212 and the action length of the second spiral arm 222 and the connecting element 24 along the support 14 can reach the minimum, the slider 23 can be moved away from the ground, until the rubber mat 233 separates from the ground. Each of the pair of elastic elements 26 can elastically resist against the corresponding pull rod 25, and can be configured to protect the first spindle 223 from moving out of the first notch 212.

The support 14 defines a rotating element 22, a slider 23, and a connecting element 24. The rotating element 22 can be engaged with the connecting element 24, to move the slider 23 along the support 14. The transport cart 100 can be fastened when the rubber mat 233 of the slider 23 presses against the ground, the transport cart 100 can be released when the rubber mat 233 of the slider 23 separates from the ground. The transport cart 100 can include a pair of pull rods 25 and a pair of elastic elements 26, it is convenient to operate the transport cart 100 using the pair of pull rods 25, and the pair of elastic elements 26 can hold the transport cart 100 steady.

The embodiments shown and described above are only examples. Many details are often found in the art such as the other features of a transport cart. Therefore, many such details are neither shown nor described. Even though numerous characteristics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A transport cart comprising:
   a main body comprising
      a plurality of supports, and
      a plurality of rollers coupled to the plurality of supports, and the transport cart being moveable by rolling the plurality of rollers;
   a plurality of fixing mechanisms assembled to main body, each of the plurality of fixing mechanisms comprising
      a first fixing element coupled to one of the plurality of supports,
      a rotating element coupled to the first fixing element,
      a slider,
      a connecting element rotationally connected between the slider and the rotating element,
      a pull rod connected to the rotating element, and
      an elastic element assembled to the main body;
   wherein the rotating element comprises a first spiral arm and a second spiral arm, and the first spiral arm and the second spiral arm are rotationally connected to the first fixing element, the pull rod is arranged on a free end of the first spiral arm;
   the slider comprises a second fixing element and a stay bar coupled to the second fixing element, and the second fixing element and the stay bar slip relative to the corresponding support, the second fixing element couples to the first fixing element via the connecting element, the second fixing element comprises a second notch away from the support;
   the connecting element is sandwiched between the second spiral arm and the second fixing element, and the second spiral arm is engaged with the connecting element, to slip the stay bar relative to the corresponding support; and the elastic element resists against the pull rod to render the transport cart immobile when first spiral arm is rotated toward the second fixing element and the pull rod is received in the second notch.

2. The transport cart as claimed in claim 1, wherein the first fixing element comprises a plurality of first screw assemblies, the first fixing element being assembled to the corresponding support by the plurality of first screw assemblies.

3. The transport cart as claimed in claim 1, wherein the plurality of fixing elements further comprise a first notch defined away from the corresponding support.

4. The transport cart as claimed in claim 3, wherein the rotating element further comprises a first spindle and a second spindle coupled to the first notch, the second spiral arm being assembled to the first spiral arms by the first spindle and the second spindle, and the first spiral arms and the second spiral arm both being rotationally connected to the first fixing element by the first spindle.

5. The transport cart as claimed in claim 1, wherein the main body further comprises an upper plate, a middle plate, and a bottom plate, the middle plate being sandwiched between the upper plate and the bottom plate, each of the plurality of supports being perpendicular to the upper plate, the middle plate, and the bottom plate, and the plurality of rollers being assembled to a surface of the bottom plate away from the middle plate.

6. The transport cart as claimed in claim 5, wherein the elastic element is connected between the upper plate and the middle plate.

7. The transport cart as claimed in claim 1, wherein a pair of shafts is defined on two ends of the pull rod, and the pair of shafts are coupled to the corresponding second notch.

8. The transport cart as claimed in claim 1, wherein the slider further comprises a rubber mat, and the rubber mat and the second fixing element are respectively assembled to two ends of the stay bar.

9. The transport cart as claimed in claim 1, wherein the slider further comprises a plurality of guiding portions fastened on the plurality of supports, and the stay bar passes through the plurality of guiding portions, and the plurality of guiding portions are configured to limit a direction of motion of the stay bar.

10. The transport cart as claimed in claim 1, wherein the connecting element is substantially bow-shaped, a length of the second spiral arm is less than that of the connecting element to fully receive the second spiral arm in the connecting element.

* * * * *